Figure 1:
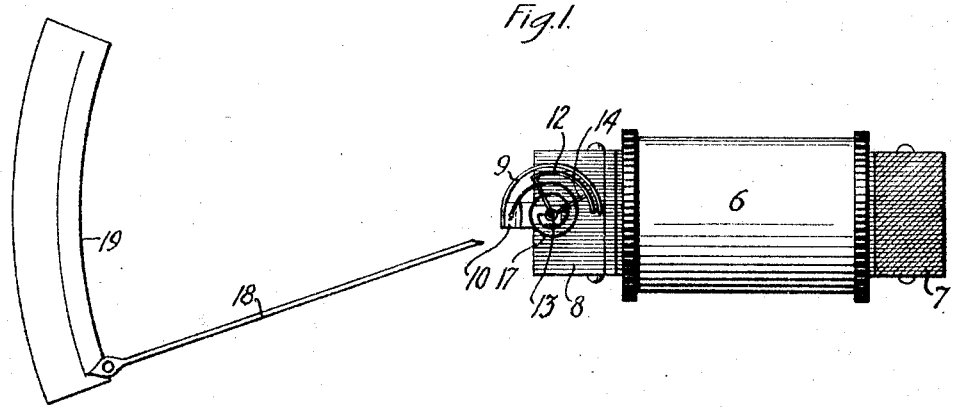

Aug. 25, 1925.

A. M. CURTIS

MEASURING INSTRUMENT

Filed Dec. 30, 1922

1,551,136

Inventor:
Austen M. Curtis.
by O. A. Sprague. Att'y.

Patented Aug. 25, 1925.

1,551,136

UNITED STATES PATENT OFFICE.

AUSTEN M. CURTIS, OF EAST ORANGE, NEW JERSEY, ASSIGNOR TO WESTERN ELECTRIC COMPANY, INCORPORATED, OF NEW YORK, N. Y., A CORPORATION OF NEW YORK.

MEASURING INSTRUMENT.

Application filed December 30, 1922. Serial No. 609,979.

*To all whom it may concern:*

Be it known that I, AUSTEN M. CURTIS, a citizen of the United States, residing at East Orange, in the county of Essex, State of New Jersey, have invented certain new and useful Improvements in Measuring Instruments, of which the following is a full, clear, concise, and exact description.

This invention relates in general to electrical measuring instruments and more particularly to an electrical measuring device of the movable iron vane type.

In electrical meters of the moving iron type it has been the common practice not to employ any magnetic material other than the fixed and movable vanes which are suitably positioned at the center of the energizing coil. As a result, the high reluctance of the magnetic circuit makes such a meter very low in sensitivity as compared with meters of the moving coil type and necessitates an appreciable amount of energy to insure a suitable deflection. Furthermore, it has been necessary to so dimension the vanes that they will be readily demagnetized.

It is an object of the present invention to provide an instrument operating on the movable iron vane principle which is more accurate than those provided heretofore or to provide an instrument having an accuracy comparable with existing types but of a much higher sensitivity.

To accomplish this object and in accordance with the principal feature of the invention there is provided an accurate electrical measuring instrument having a magnetic circuit of much higher efficiency than has been possible heretofore with meters of the moving iron type without resulting in prohibitive errors due to hysteresis and the effect of residual magnetism. In the preferred form high sensitivity is obtained by providing a substantially closed magnetic circuit and excessive errors are eliminated by employing in the magnetic circuit a material having a low hysteresis factor, a coercivity less than that of iron and at the same time a permeability for low magnetizing forces much greater than that of iron.

Silicon steel which has heretofore been largely used as the material for similar magnetic circuits is objectionable not only because of its comparative brittleness and the difficulty of working it, but also because it has a high coercive force. A nickel iron alloy when given a suitable heat treatment has been found to have a permeability greater than that of iron for low magnetizing forces of the order of 2/10 gauss or less and a coercivity much below that of iron. Particularly good results were obtained in tests when employing a nickel iron alloy prepared by fusing nickel and iron together in the proportion of 78½% nickel and 21½% iron, good commercial grades of these materials being suitable for this purpose. Good results may be obtained when the nickel content predominates and the rest is iron or iron with small per cents of other elements which may be present as impurities or to increase the resistivity, as may be done for example by adding chromium. The fused composition is poured into a mold to bring it at once to the proper shape, or it may be brought to the desired shape after molding by being hammered, swaged, drawn, rolled, or worked in any other manner. After being brought to the desired shape, the composition is given a heat-treatment to develop therein the highest permeability possible at low magnetizing forces and the lowest possible coercive force. According to present practice, this is done by heating the desired shapes to a temperature of about 850° C., maintaining it at that temperature for a few minutes to insure a uniform temperature throughout and a uniform molecular structure, then cooling slowly to a temperature of about 600° C. which is just about the critical or transition temperature of the alloy, that is, the temperature at which the magnetic properties disappear on heating and reappear on cooling; and finally cooling from that temperature more rapidly but at a definite rate dependent upon the ratio of nickel to iron in the alloy. A convenient method of securing the desired rate of cooling after the material has been maintained for a few minutes at a temperature of 850° C. has been found to be a rapid withdrawing of the material from the furnace and placing it in a blast of air which is controlled to secure a desired rate of cooling. The necessary cooling will always be at a rate intermediate that required for annealing and that at which such strains would be set up in the material as to lower its permeability below the desired value.

Figure 2:
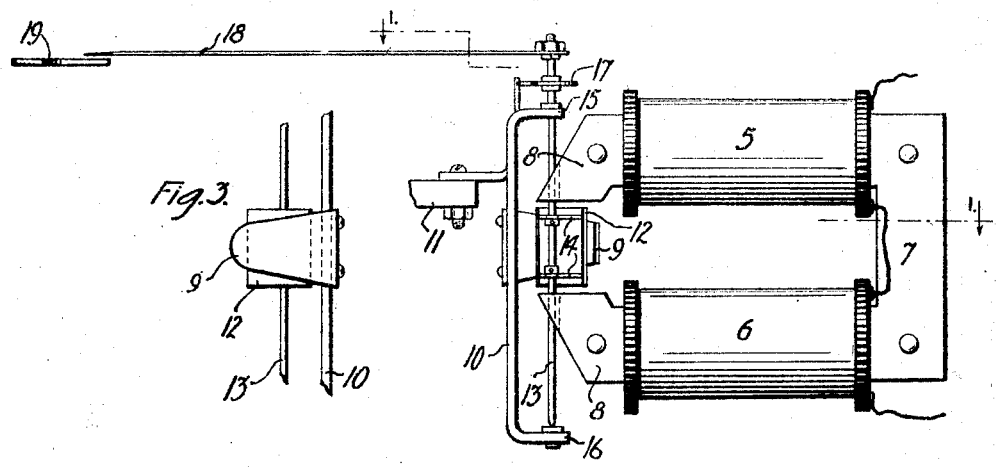
Figure 3:
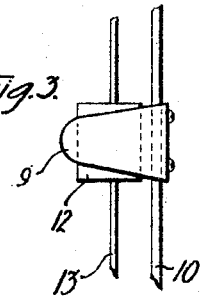

This invention may be more clearly understood by reference to the accompanying drawing in which Fig. 1 is a sectional view taken along the lines 1—1 of Fig. 2 showing an electrical measuring instrument embodying the features of the invention; Fig. 2 is an elevation of the device of Fig. 1 and Fig. 3 is a partial view showing the relation of the movable and fixed vanes.

Referring to the drawings the energizing coils 5 and 6 are positioned on the branches of the U-shaped magnetic member 7, which preferably consists of laminations securely riveted together and the vane members are located between the pole pieces 8 and 9 which are designed to provide a substantially uniform magnetic field. The fixed vane 9 is riveted or otherwise secured to a fixed support 10 which in turn is secured to the frame member 11. The movable vane 12 is concentric with the vane 9 and is secured to a shaft 13 by means of spiders 14—14. The shaft rotates in the bearings 15—16 and at its upper end is provided with a coiled retractile spring 17 and a needle 18 which is adapted to sweep over a scale 19.

Upon the flow of current through the energizing coils 5 and 6, the resulting magnetic field produced between pole pieces 8—8 causes repulsion between the vanes 9 and 12 and as vane 12 rotates upon the shaft 10, the needle 18 sweeps over the scale 19. The vane 9 is so shaped, taking into consideration the characteristics of the spring 17, that calibration produces a suitable graduation of the scale.

The vanes 9 and 12 and the U-shaped magnetic member 7 are composed of a nickel iron alloy which has been given a suitable heat treatment to insure a low hysteresis factor, low coercivity and a high permeability for low magnetizing forces. The other parts of the system are made of non-magnetic material, the needle, spiders and shaft being preferably of aluminum to insure as light a moving system as possible. As a result of the low hysteresis factor of the material employed, the error due to hysteresis is practically eliminated and the sensitivity of the instrument is greatly increased by the use of the more efficient magnetic circuit made possible because of the low coercivity and high permeability of the material employed. Furthermore, the characteristic of high permeability at low magnetizing forces makes this instrument particularly suitable for use in measuring small current valves where the magnetizing forces are small.

What is claimed is:

1. A measuring instrument comprising an energizing coil, a movable and a fixed vane in the magnetic field of said coil and means for indicating the relative movement of the vanes, said vanes being composed of a nickel iron alloy consisting of approximately 78½% nickel and 21½% iron.

2. A measuring instrument comprising an energizing coil, a magnetic core therefor composed of a material having at low magnetizing forces a permeability higher than that of iron, a fixed vane and a movable vane positioned in the magnetic field existing between the ends of said magnetic core, and means for indicating an angular movement of said movable vane produced by a variation in the current flowing through the energizing coil.

3. A measuring instrument comprising an energizing coil, a magnetic core therefor composed of a nickel iron alloy in which the nickel component predominates, a fixed vane and a movable vane positioned in the magnetic field existing between the ends of said magnetic core, and means for indicating an angular movement of said movable vane produced by a variation in the current flowing through the energizing coil.

4. A measuring instrument comprising an energizing coil, a magnetic core therefor composed of a nickel iron alloy consisting of approximately 78½% nickel and 21½% iron, a fixed vane and a movable vane positioned in the magnetic field existing between the ends of said magnetic core, and means for indicating an angular movement of said movable vane produced by a variation in the current flowing through the energizing coil.

5. A measuring instrument comprising an energizing coil, a magnetic core therefor, a fixed vane and a movable vane positioned in the magnetic field existing between the ends of said magnetic circuit, and means for indicating the relative movement of said vanes, said magnetic core and said vanes being composed of a material having a coercivity lower than that of iron and a permeability greater than that of iron for low magnetizing forces.

6. A measuring instrument comprising an energizing coil, a magnetic core therefor, a fixed vane and a movable vane positioned in the magnetic field existing between the ends of said magnetic core, and means for indicating the relative movement of said vanes, said magnetic core and said vanes being composed of a nickel iron alloy in which the nickel component predominates.

7. A measuring instrument comprising an energizing coil, a magnetic core therefor, a fixed vane and a movable vane positioned in the magnetic field existing between the ends of said magnetic core, and means for indicating the relative movement of said vanes, said magnetic core and said vanes being composed of an alloy containing approximately 78½% nickel.

8. A measuring instrument comprising an energizing coil, a magnetic core therefor, a fixed vane and a movable vane positioned in the magnetic field existing between the ends of said magnetic core, and means for indicating the relative movement of said vanes, said magnetic core and said vanes being composed of a nickel iron alloy containing 78½% nickel and 21½% iron.

In witness whereof, I hereunto subscribe my name this 29th day of December, A. D., 1922.

AUSTEN M. CURTIS.